United States Patent
Rutman (10) Patent No.: US 10,331,363 B2
(45) Date of Patent: Jun. 25, 2019

(54) MONITORING MODIFICATIONS TO DATA BLOCKS

(71) Applicant: Seagate Technology LLC, Cupertino, CA (US)

(72) Inventor: Nathaniel Rutman, Portland, OR (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/821,577

(22) Filed: Nov. 22, 2017

(65) Prior Publication Data
US 2019/0155522 A1    May 23, 2019

(51) Int. Cl.
G06F 11/14    (2006.01)
G06F 3/06    (2006.01)

(52) U.S. Cl.
CPC ............ *G06F 3/0619* (2013.01); *G06F 3/065* (2013.01); *G06F 3/0607* (2013.01); *G06F 3/0653* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 7,606,841 B1 | 10/2009 | Ranade | |
| 8,234,517 B2 | 7/2012 | Bamford et al. | |
| 9,063,864 B2 | 6/2015 | Chang et al. | |
| 9,720,752 B2 | 8/2017 | Mu et al. | |
| 2003/0154314 A1* | 8/2003 | Mason, Jr. | H04L 29/12009 709/250 |
| 2003/0177321 A1* | 9/2003 | Watanabe | G06F 11/2058 711/161 |
| 2007/0061531 A1 | 3/2007 | Bartfai et al. | |
| 2010/0228913 A1* | 9/2010 | Czezatke | G06F 11/1451 711/112 |
| 2013/0067179 A1 | 3/2013 | Paleologu et al. | |
| 2015/0199243 A1* | 7/2015 | Wu | G06F 11/1458 707/626 |
| 2016/0048532 A1* | 2/2016 | Islam | G06F 17/30132 707/613 |
| 2017/0003895 A1* | 1/2017 | Hatfield | G06F 3/0619 |
| 2017/0300244 A1* | 10/2017 | Crawford | G06F 3/0619 |

* cited by examiner

*Primary Examiner* — Ryan Bertram
*Assistant Examiner* — Trang K Ta
(74) *Attorney, Agent, or Firm* — Mueting, Raasch & Gebhardt, P.A.

(57) ABSTRACT

A node includes a controller that includes one or more processors. The controller may be configured to load data from a storage data block of a plurality of storage data blocks stored on one or more first data storage devices to a working data block stored on one or more second data storage devices. In response to a node experiencing a failure, the controller can be configured to determine a change value for the working data block. The controller can be configured to determine whether data stored in the working data block is different than data stored in the corresponding storage data block based on the determined change value and a provided change value that corresponds to the storage data block.

19 Claims, 5 Drawing Sheets

MONITORING MODIFICATIONS TO DATA BLOCKS

The present disclosure relates to data storage systems. In particular, the present disclosure relates to monitoring modifications of data stored in data storage systems even if volatile memory that stores an indication of which data has been modified is lost during a node failure.

SUMMARY

Various embodiments of the present disclosure relate to a mechanism for monitoring modifications to data when a page table that indicates which portions of data have been modified is lost during a node failure. This mechanism may be used in a system for data storage, which may include nodes, devices, or other storage components that can fail.

In one aspect, the present disclosure relates to a node including a controller that includes one or more processors. The controller may be configured to load data from a storage data block of the plurality of storage data blocks stored on the one or more first data storage devices to a working data block stored on the one or more second data storage devices. The one or more first data storage devices may store a plurality of storage data blocks. The one or more second data storage devices may store a plurality of working data blocks. Each working data block of the one or more second data storage devices can correspond to one of the plurality of storage data blocks of the one or more first data storage devices.

In response to a node experiencing a failure, the controller can also be configured to determine a change value for the working data block stored on the one or more second data storage devices. The controller can also be configured to determine whether data stored in the working data block is different than data stored in the corresponding storage data block of the one or more first data storage devices based on the determined change value and a provided change value that corresponds to the storage data block of the one or more first data storage devices.

In one aspect, the present disclosure relates to a system including one or more first data storage devices that store a plurality of storage data blocks. The system can include one or more second data storage devices that store at least one working data block during use thereof. Each of the at least one working data block may correspond to a different storage data block of the plurality of storage data blocks. The system can include a node operably coupled to the first data storage devices and the second data storage devices. The node can comprise a controller. The controller may be configured to provide a first change value for each of the plurality of data blocks of the first data storage devices. The controller may also be configured to, in response to a node failure, determine a second change value for each of the at least one working data block of the second data storage devices. The controller may also be configured to determine whether the at least one working data block is different than the corresponding storage data block of the plurality of storage data blocks of the first data storage devices based on the first and second change values.

In another aspect, the present disclosure relates to a method including receiving a first change value associated with a storage data block stored in one or more first data storage devices. The one or more first data storage devices may store one or more storage data blocks. The method can also include determining a second change value associated with a working data block of one or more second data storage devices. The one or more second data storage devices may store one or more working data blocks during use thereof. The data stored in the storage data block can correspond to data stored in the working data block. The method can also include comparing the first change value to the second change value. The method may also include, in response to the first change value being different than the second change value, updating the storage data block in the one or more first data storage devices.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

The present disclosure relates to systems, methods, and processes for monitoring modifications to data stored in data storage devices, such as cloud storage systems, servers, hard drives, etc. Although reference is made herein to nodes, devices, and storage devices, data may be stored in any suitable data storage system with available storage space that stores data on different devices or nodes. Non-limiting examples of data storage devices include hard disk drives, solid state drives, and multilayer drives (for example, utilizing both hard disk and solid state). Various other applications will become apparent to one of skill in the art having the benefit of the present disclosure.

In many data storage systems, it can be beneficial to monitor modifications performed on data when the data is stored in multiple locations. As an example, if data is being initially stored and transferred from a first location (e.g., one or more first data storage devices) to a second location (e.g., one or more second data storage devices), modification of the data in the second location can be monitored so that the corresponding data in the first location can be modified in the same way as well. In this way, the data stored in the first location that corresponds to the data stored in the second location can match the data stored in the second location.

A fast page table in dynamic (non-persistent) node memory (e.g., DRAM) can be used to monitor these data modifications and an indication in the page table can indicate which working data blocks in the second data storage devices have been modified and which corresponding storage data blocks in the first data storage devices should be updated. However, while the data is modified in the first location and prior to the data in the second location being modified in kind, a transient node failure can cause loss of the page table. This can create a problem when the data modification in the first location is not lost during the node failure (e.g., the data is persistently stored and/or stored in non-volatile memory) but the page table is lost, thereby creating conflicting data in the corresponding first and second locations.

In order to determine which working data blocks have been modified even if a node has failed, the following methods, systems, and procedures can be utilized. One or more first data storage devices can store a change value that corresponds to each storage data block stored in the one or more first data storage devices. This first change value can indicate a particular sequence of data stored in a storage data block of the one or more first data storage devices. For example, the change value can be a checksum value that is a digit that represents a sum of correct digits in a block of stored or transmitted data, against which later comparisons can be made to detect errors and/or changes in the data.

In the event of a node failure, a second change value can be determined for the data in the working data block and this second change value can be compared to the previously determined change value for the data while it was stored in the corresponding storage data block of the one or more first data storage devices. The second change value can be compared to the corresponding first change value. The first change value and the second change value being a same value would indicate that the working data block was not modified and the data in the storage data block of the corresponding one or more first data storage devices would not be updated. The first change value and the second change value being different values would indicate that the working data block was modified and the data in the storage data block of the corresponding one or more first data storage devices should be updated with the modified data from the corresponding working data block.

While particular examples have been described to this point, examples are not so limited. Any number of storage data blocks and/or any number of corresponding working data blocks can be used. However, working data blocks refer to a subset of storage data blocks in data storage as data is transferred from the data storage to the working data blocks to be operated on. Modifications made to the working data blocks are written back to the storage data blocks so that there is a one-to-one correlation between data blocks. For example, a first portion of storage data blocks in data storage can be transferred to the working data blocks. At least one data block of the first portion of data in the working data blocks can be modified (e.g., worked on). Those modifications can be written to the first portion of the data storage. A second portion of the data storage can be transferred to the working data blocks (and thereby replacing at least a portion of the first portion of data previously transferred there). The second portion of data blocks in the working data blocks can be modified. The modifications to the second portion in the working data blocks can be transferred to the second portion of the data storage. Furthermore, any number of change values, in addition to checksum values, can be used to indicate that a particular set of data has been stored in a storage data block and/or working data block.

Figure 1:
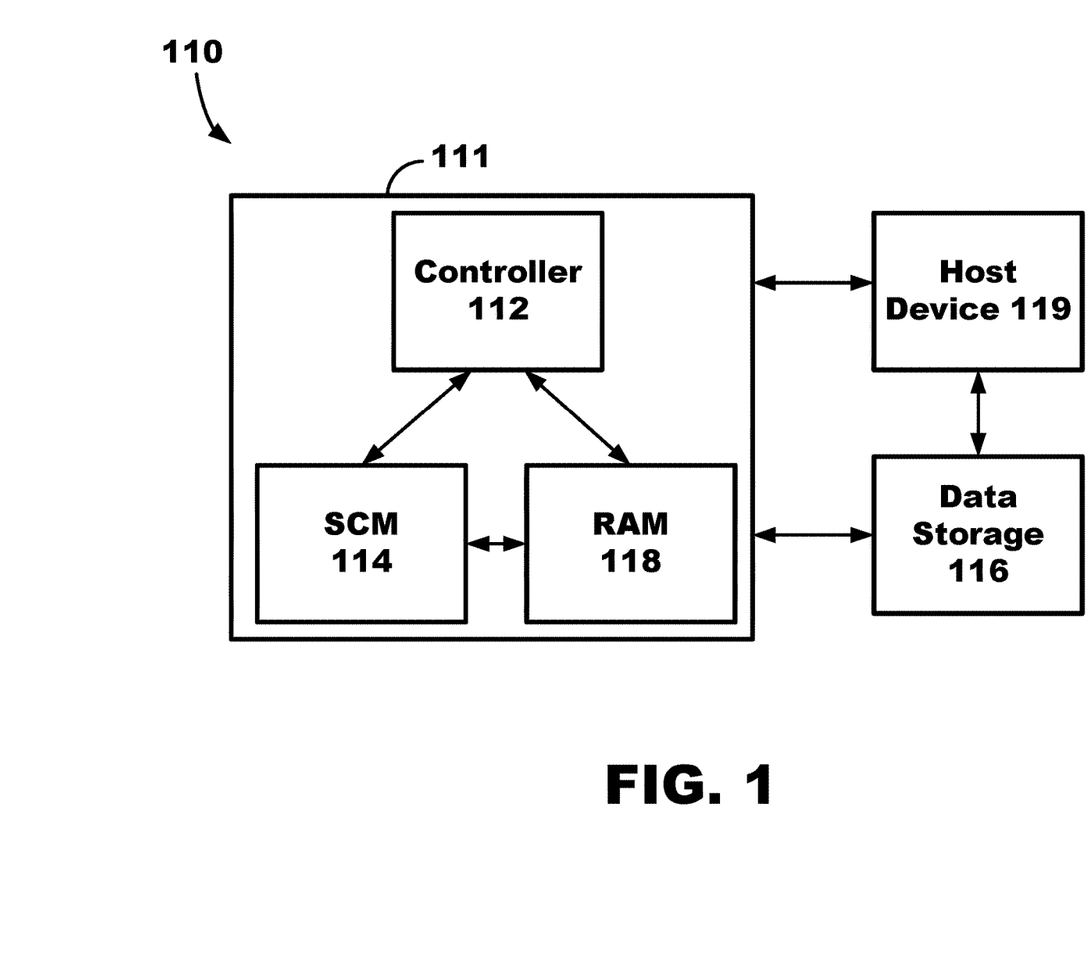
FIG. 1 is a block diagram of an example system for storing data blocks in accordance with embodiments of the present disclosure.

FIG. 1 shows a block diagram of a system 110 for storing and/or working with data blocks. The system 110 includes a node 111. The node can include a controller 112, a storage class memory (SCM) 114, and random access memory (RAM) 118. The system can include a host device 119 in communication with the node 111 and a data storage 116 in communication with the host device 119 and the node 111. While particular types of memory are described, such as SCM 114 and RAM 118, embodiments are not so limited. Any number of different types of memories can be used for a similar purpose and will be appreciated by those skilled in the art. As an example, the SCM 114 and the data storage 116 can alternatively be any form of persistent, or nonvolatile, memory where the persistent, or nonvolatile, memory stores a subset of data from the data storage 116, which may also be any form of persistent memory or nonvolatile memory. The RAM 118 may be non-persistent memory or volatile memory. In at least one embodiment, the RAM 118 can be located external to the node 111 and be in communication with the node 111, although not illustrated in FIG. 1. While the example illustrates the node 111 including a controller 112, SCM 114, and RAM 118, examples are not so limited. That is, in at least one example, the RAM 118 may be external to the node 111 and the data storage 116 may be internal to the node 111. The node 111 can refer to devices or system locations on a larger network. The devices can include computers, cell phones, printers, processors, etc. and in some examples can be associated with an identifier (e.g., such as an internet protocol (IP) address). Further, although a single node is described, it is to be understood that the system may include more than one node.

Each of the data storage apparatuses including the SCM 114, the data storage 116, and/or the RAM 118 may include any device and/or apparatus configured to store data (for example, binary data, etc.). The data storage apparatuses can include, but are not necessarily limited to, solid state memory, hard magnetic discs, magnetic tapes, optical discs, integrated circuits, and any combination thereof. The SCM 114 and the data storage can be persistent or non-volatile memory that is persistently stored while the RAM 118 can be volatile or non-persistent memory. Further, each data storage apparatus may be an array of storage devices such as, for example, a RAID (redundant array of inexpensive disks) storage arrangement. Each data storage apparatus may be a server or virtual server. It is to be understood that this disclosure is not limited to the system 110 depicted in FIG. 1, and, instead, the system 110 is only one exemplary configuration. For example, system 110 may include one or more of a local filesystem, a storage area network (SAN) file system, a distributed file system, a parallel file system, a virtual file system, and/or combinations thereof. In various embodiments, each data storage apparatus may be described as a storage device. In some further embodiments, each data storage apparatus may be described as a node, each of which may include a plurality of storage devices.

The controller 112 can be configured to provide the reading and writing of one or more data blocks from and to the SCM 114 and the data storage 116. For example, the controller 112 may receive a request from a host device 119 requesting a storage data block stored in the data storage 116. In response, the controller 112 can cause the requested storage data block to be read from the data storage 116 and a copy of the read data block stored in the SCM 114 to be operated as a working data block. Further, the RAM 118 can be a volatile or non-persistent memory used to store operation data and instructions, such as page table data, to monitor which storage data blocks that were read into the SCM 114 as working data blocks and were subsequently modified (referred to as a "dirty" data block).

The system 110 may include a controller 112, such as a central processing unit (CPU), computer, logic array, or other device capable of directing data coming into or out of the system 110. The processor of the controller 112 may include any one or more of a microprocessor, a controller, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system. In at least one embodiment, the system 110 includes a host device 119 in communication with the controller 112, the SCM 114, the data storage 116, and the RAM 118. In some embodiments, the controller 112 may include one or more computing devices having memory, processing, and communication hardware. The functions of the controller 112 may be performed by hardware and/or as computer instructions on a non-transient computer readable storage medium.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

It may be further described that the SCM 114 can be used in a memory-oriented application program interface (API) in a system such as system 110. That is, the SCM 114 can be used in a system that reads and writes chunks of data that are addressable down to a single-byte granularity. A memory-oriented application programming interface (API) that loads and/or stores operations between memory and processor registers can be used to interact with the SCM 114. In this way, the SCM 114 can provide a direct, local working memory for an application. In at least one embodiment, it can be beneficial to save data in the SCM 114 to another storage system, such as data storage 116, with chunks of data in the SCM 114, that are equivalent in size to a data block in the data storage 116, being used as a "working set" (referred to herein as a working data block). Put another way, while the SCM 114 works on data down to a size of a byte, a plurality of bytes in the SCM 114 equivalent in size to a data block (e.g., a "working data block") can be correlated with a data block (e.g., a "storage data block") of the data storage 116. As an example, a data block can refer, more specifically, to 512 or 4096 bytes of data.

In at least one approach to using SCMs in general, a "check-point" restart can be used in which a large quantity of compute nodes work on a very large, shared data set to solve a particular problem. The data in the SCM comprises a subset of the total simulation data stored in the data storage system. The compute nodes can periodically save their current working data set to a file system, e.g., data storage 116. In response to a node failing, the state of the node can be restored from its last saved checkpoint. However, as the SCM of the node becomes larger, writing the entire portion of memory in the SCM to the data storage can be time consuming.

Instead, the node can monitor which data blocks in memory have been modified by using a page table (also referred to as a "dirty page bitmap," whereby a dirty page refers to a modified page of data). The page table can be stored in kernel memory such as RAM 118. In this way, only the pages of data indicated as modified in the page table would be written to a persistent data storage, such as data storage 116. Further, the page table can be sent to a system server as part of a direct memory access (DMA) setup for writing data to the data storage. The page table can indicate to the server which pages of memory on the node to transfer during the DMA operation. When the DMA operation is complete, the server writes the modified pages from the SCM 114 to data storage 116. However, as the modified data in the SCM 114 is persistently stored and the page table data is stored in volatile memory, modifications to the working data blocks in the SCM 114 can survive a node failure while the page table may not.

Failures may be tracked by the system. For example, when a device or node fails, the units associated with the device or node may be tracked as failed units. This known failure information may be updated in response to detecting a new failure. The known failure information may be used in various ways to store and retrieve information. In some embodiments, the node that failed may be identified and data associated with the node failure (e.g., page table information lost during the failure) may be recovered through additional methods, as described below. In such embodiments, which data blocks have been modified prior to the failure can be determined.

To address the situation where the modified data in the SCM 114 remains while the page table is lost during a node failure, the node 111 can determine a change value corresponding to each storage data block in the data storage 116 and store this change value in the data storage 116 as well. As an example, the change value can be a checksum value that is already used to protect against media degradation errors (referred to as "bitrot"). In addition, the change value can be an indication of an order of data at a particular point in time. Once the node failure occurs, the node 111 can determine an additional change value associated with each working data block stored in the SCM 114. The change value of corresponding storage data blocks stored in the data storage 116 may be compared to the additional change value of the working data blocks stored in the SCM 114. Data blocks with differing change values of corresponding data in the data storage 116 and the SCM 114 have been modified in the SCM 114. The modified working data blocks of the SCM 114 should be written to the data storage 116, thereby updating data modifications in the data storage 116 without having to write all of the data of the SCM 114 to the data storage 116, as in some previous approaches.

Figure 2:
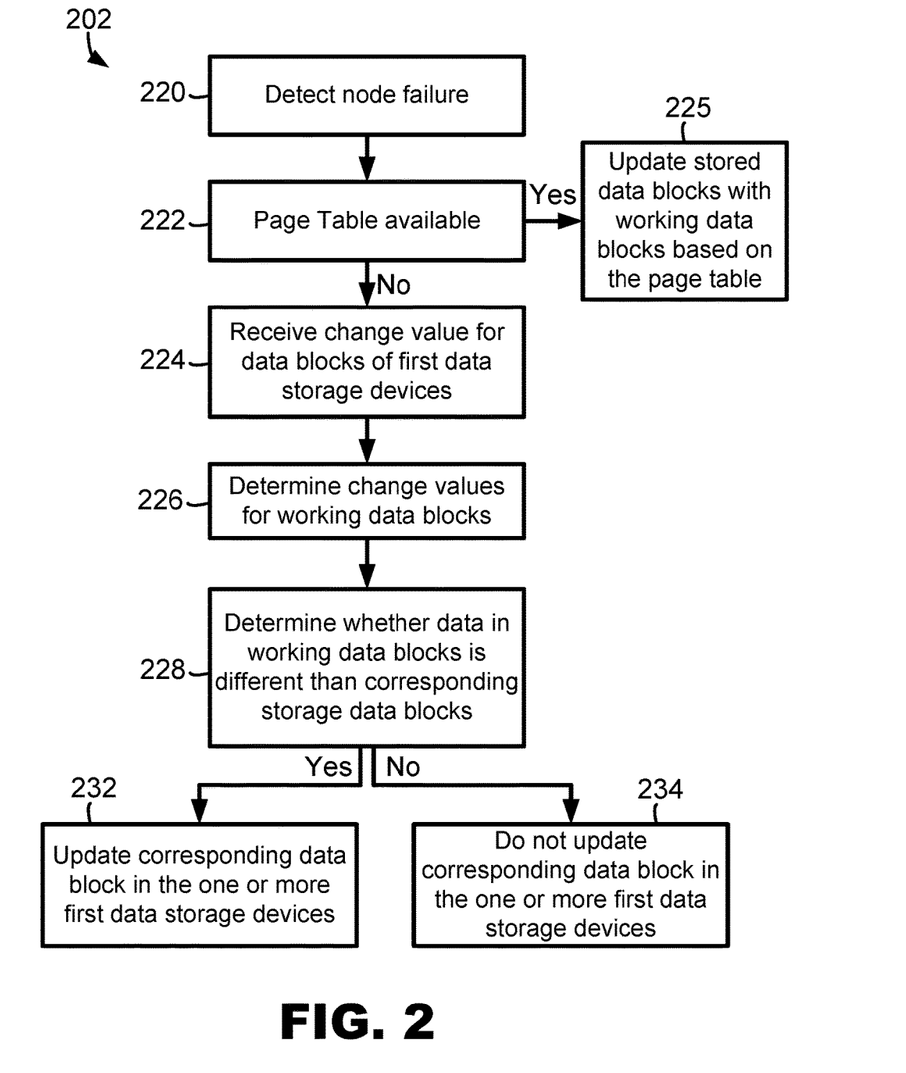
FIG. 2 is a flowchart of an example method of monitoring modifications of data in accordance with embodiments of the present disclosure.

FIG. 2 is a flowchart of an example method of monitoring modifications of data in accordance with embodiments of the present disclosure. In process 220, a node failure can be detected. In response to a node failure, 222, a determination of whether a page table is available can be performed. In response to a page table being available 225, each data block indicated by the page table as being modified in an SCM (such as SCM 114 of FIG. 1) can be written from the working data block of the SCM to a corresponding storage data block of a persistent data storage device (such as data storage 116 in FIG. 1).

However, in response to a page table being lost during the detected node failure, such as due to the page table being stored in volatile memory, a change value can be received, 224, at the failed node for each data block stored in the SCM 114 working data blocks in the failed node (e.g., in the SCM of the failed node). Each corresponding change value can be transferred from a data storage device (such as data storage 116 in FIG. 1) to the failed node. Each change value can be previously determined, as at the time the storage data blocks were initially stored in the data storage, or at some point prior to transferring the storage data blocks from the data storage to the working data blocks stored in the SCM. Failures may correspond to the failure of a node, device, or other storage component. The failure may affect one or more units storing information. For example, a failure may be detected when the user attempts to retrieve information from a data block. The node and/or device attempting to read units of the data block may detect that the information retrieved fails to satisfy an error correction code (ECC) check. The retrieval failure may result in a determination that a node, device, or other storage component (for example, a sector) has failed.

The method 202 can further include determining a change value for each working data block stored in the working memory of the SCM of the node that has failed 226. At this point, there is a one-to-one correlation between each of the received change values that are for storage data blocks stored in the data storage and each of the determined change values that are for working data blocks stored in the persistent working memory (e.g., SCM of the failed node). The method 202 can include comparing the received change values and each corresponding determined change value 228. The method 202 can include determining whether the comparison indicates the received change value is the same as the determined change value 230.

In response to the received change value being a different value than the determined change value 230, the method 202 can include updating a corresponding storage data block in the one or more first data storage devices (e.g., persistent data storage 116 in FIG. 1) 232. The updating can include writing the modified data of the working data block in a working persistent data memory (e.g., SCM 114 in FIG. 1) to the corresponding storage data block stored in the persistent (non-working) data storage (e.g., data storage 116 in FIG. 1). In this way, consistency is maintained between the working data blocks and the more permanently stored storage data blocks. In response to the received change value being a same value as the determined change value (indicated by a Yes from process 230), the method 202 can include not updating a corresponding storage data block in one or more first data storage devices (as an example, one or more first data storage devices of data storage 116 in FIG. 1) 234. That is, the received change value and the determined change value being a same change value indicates that the same data is stored in the working data block of the working memory (e.g., of SCM 114 of FIG. 1) and is stored in the corresponding storage data block (e.g., of the data storage 116 of FIG. 1) and therefore the working data block has not been modified.

Figure 3:
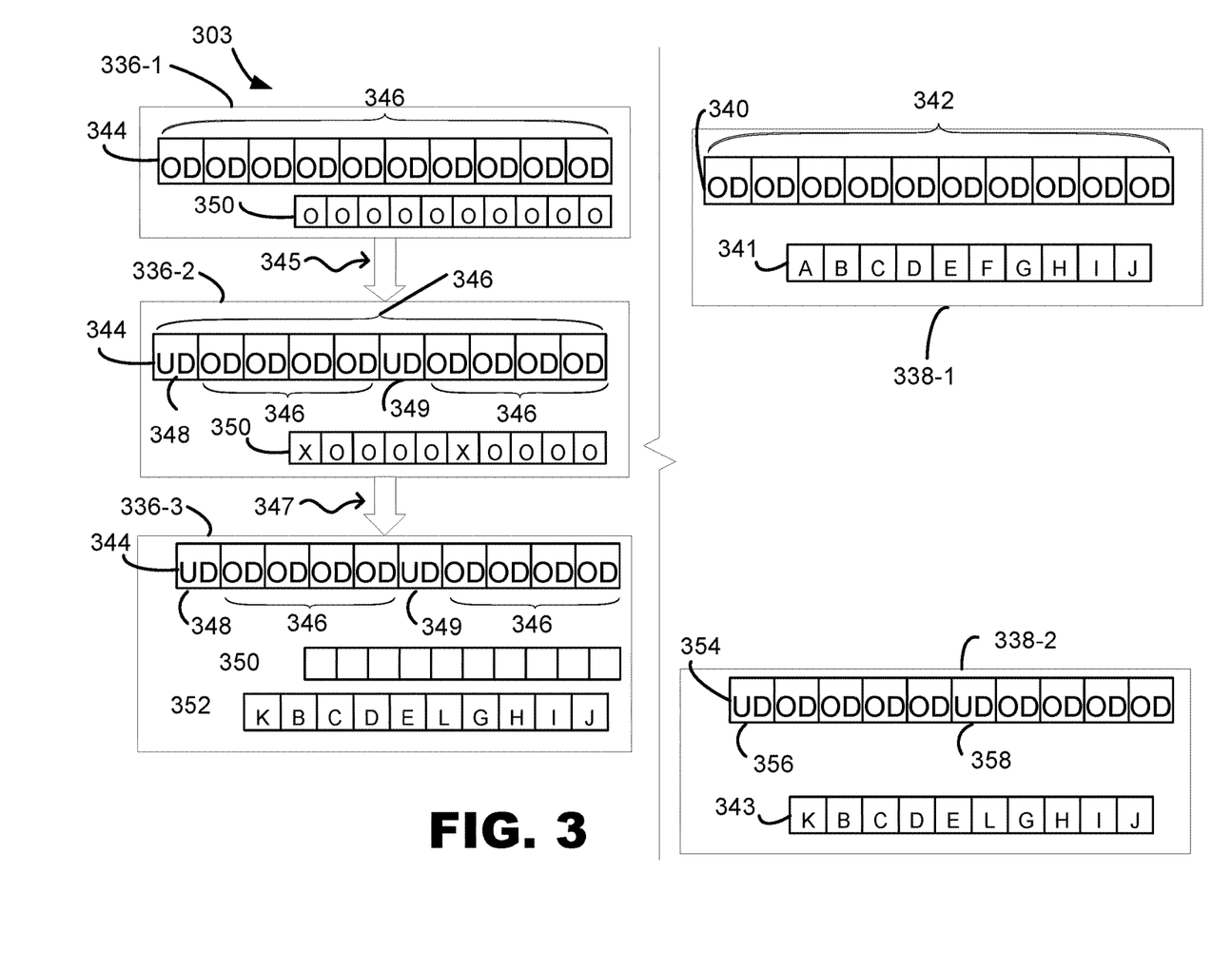
FIG. 3 is a diagram of an example data storage devices in accordance with embodiments of the present disclosure.

FIG. 3 illustrates a diagram of example data storage devices including nodes 336-1, 336-2, 336-3 for working data blocks (such as within an SCM) and nodes 338-1, 338-2 for data storage blocks (such as those in data storage) and their interaction during node failure in accordance with embodiments of the present disclosure. The system 303 may include a plurality of nodes 336 (including 336-1, 336-2, 336-3, which are a same node referred to herein collectively as node 336), and 338 (including 338-1, 338-2, which are a same node in data storage prior to and subsequent to being written to with updates from the working data blocks but referred to herein collectively as 338) to store one or more units of data 340, 344 (where unit of data 340 includes storage data blocks and unit of data 344 includes working data blocks). Other units of data including additional data blocks may also be stored on the system 303 in addition to units of data 340, 344. Each unit of data 340, 344 is stored in a corresponding node 336 and 338, respectively. While the nodes 336 refer to storing working data blocks using SCM, examples are not so limited. That is, any number of working data storage devices can be used and will be appreciated by those skilled in the art.

Each node 336, 338 may represent a different physical and/or logical grouping of devices (such as in system 110 in FIG. 1), such as a different array, a different rack, a different room, a different data center, or a different geographic region. In some embodiments, each node 336, 338 may be operably coupled, for example, by a network and form part of a storage network.

Each node 336, 338 may include a plurality of storage locations (such as SCM 114 and data storage 116 in FIG. 1) associated with the node. While the plurality of storage locations are described as being on the node, a node can include any number of the storage locations and be in communication with additional storage locations. As an example, a node could include a working persistent data storage location (such as SCM 114 in FIG. 1) and be in communication with a persistent data storage location (such as data storage 116 in FIG. 1). As another example, the node could include both the working data storage location and the persistent data storage location. A storage location may refer to a physical or logical location, or address, within the storage space. Each storage location may be associated with any suitable amount of storage space, such as one or more storage data blocks or extents. In some embodiments, each node 336, 338 may include a plurality of devices, and each device may include a plurality of storage locations. Each device may be a data storage apparatus or data storage drive that provides space to store information, such as a hard disk drive, a solid-state drive, or a multilayer drive.

In some embodiments, a storage location may include a device identifier, a location on a device, or both. The storage location may identify one or more of a node, a device, and a particular location on a device. For example, the output of the layout function may be specific and identify the particular location on a particular device on a particular node. In another example, the output of the layout function may be less specific and identify a particular device on a particular node but not a particular location on the device. Another mechanism, on the device level, may determine the particular location on the device, for example, in response to one or more of the inputs of the layout function or another output of the layout function.

Each of the number of units of data 344, 340 stored in each of node 336 and 338, respectively, may include a plurality of data blocks 346, 342, respectively. As an example, node 336-1 includes unit of data 344 which includes ten (10) working data blocks 346. A unit may refer to an amount of storage space and may also refer to an associated location for that space (for example, the storage location 114 in FIG. 1). In some embodiments, a unit may include one or more storage data blocks. Different types of units may have the same or different amount of storage space. The data units 344, 340 may store user data information that is to be read, written, and modified. The ten storage data blocks 342 of unit of data 340 in node 338-1 can correspond to the ten working data blocks 346 of unit of data 344 in node 336-1. That is, a first storage data block of unit of data 340 corresponds to a first working data block of unit of data 344, a second storage data block of unit of data 340 corresponds to a second working data block of unit of data 344, and so forth. In this way, the SCM of node 336 can serve as a cache that is faster to access the data than when stored in the storage data blocks.

Each of the working data blocks 346 is illustrated as including original data "OD," indicating that the data transferred from nodes 338 (e.g., data storage) has not been modified in the working data blocks 346. Node 336-1 is an illustration of a node prior to data blocks being modified (as all of the data blocks 346 are illustrated with an "OD"). Node 336-2 is an illustration of that same node 336-1 after modifications, illustrated by arrow 345, are performed on at least one data block. In this example, a first working data block 348 of unit of data 344 (illustrated with "UD" within the illustrated data block) and a sixth working data block 349 (illustrated with "UD" again) has been modified. The storage data blocks 342 of data unit 340 stored in node 338 are illustrated as "OD" as the storage data blocks 342 do not store working data blocks. That is, data is not modified and worked on within the node 338. Rather, data is modified in the node 336 (storing working data blocks) and modified data is written back to the node 338 (e.g., data storage).

Node 336 includes a page table 350 that indicates whether a particular working data block has been modified. As an example, page table 350 illustrated as part of node 336-1 includes "0000000000," indicating that none of the data blocks in unit of data 344 have been modified. As working data blocks in data unit 344 of node 336-1 are modified, as illustrated by node 336-2 with updated working data blocks ("UD") 348 and 349, the page table 350 is also updated. As an example, page table 350 in node 336-2 now includes "X0000X0000," where an "X" indicates a modification. In this example, the page table indicates that the first and sixth working data blocks of data unit 344 have been modified.

Prior to, in conjunction with, or after addition of, data being transferred from the node 336 to the node 338, change values can be determined for each corresponding data block. As an example, a change value, indicated by an "A" for a first storage data block is determined and stored in node 338-1. A change value, indicated by a "B" for the second storage data block is determined and stored in node 338-1, and so forth for change values indicated by "C," "D," "E," "F," "G," "H," "I," and "J" for each corresponding third, fourth, fifth, sixth, seventh, eighth, ninth, and tenth data block, respectively. While this description includes the change values being determined prior to transferring data, the change values can be determined at any point during system operation. As an example, the change values can be determined: prior to transferring data from node 338 to node 336, during modification of the working data blocks in the node 336, in response to a node failure, etc. A change value, as described above, can indicate an ordering of data within a particular location (e.g., within a unit of data 340). In at least one example, the change value can be a checksum value.

Node 336-3 is an illustration of node 336 after experiencing a node failure, as illustrated by arrow 347 (and, in this example, subsequent to modification of working data blocks 348 and 349, as illustrated by node 336-2). A node failure can cause loss of data. For example, volatile memory and/or kernel memory can be loss during a node failure. In at least one example, page table 350 is stored in this type of memory and can be lost during the node failure, as illustrated in page table 350 of node 336-3 that shows the page table information has been lost. Using the page table 350 to determine which data blocks have been modified is no longer possible during this type of node failure. A different approach can be used to recover which data blocks have been modified.

In at least one example, in response to a node failure, a controller can cause a determination of a change value for each corresponding working data block of unit of data 344 and store it as a change value data 352. As an example, a first change value for a first working data block of unit of data 344 in node 336-3 can be determined, as illustrated as "K" in the change value data 352. Letters are used herein to represent a particular value of the change value where two same letters indicate a same change value and two different letters indicate different change values. These illustrates letters are not limited to any particular value of the change value. A second change value for a second working data block of unit of data 344 in node 336-3 can be determined, as illustrated as "B" in the change value data 352. A third change value for a third working data block of unit of data 344 in node 336-3 can be determined, as illustrated as "C" in the change value data 352, and so forth for a fourth, fifth, sixth, seventh, eighth, ninth, and tenth change value for each of a respective fourth, fifth, sixth, seventh, eighth, ninth, and tenth working data block, illustrated as "D," "E," "L," "G," "H," "I," and "J." As is illustrated, the first working data block 348 and the sixth working data block 349 have updated data (indicated by "UD") and their corresponding change values "K" and "L" are different than the corresponding change values in the change value data 341 of node 338-1.

The change value data 352 of node 336-3 can be compared to the change value data 341 of node 338-1 in order to determine whether working data blocks of node 336-3 have been modified. A change value of change value data 352 being different than its corresponding change value of change value data 341 indicates that the respective working data block has been modified. In the alternative, a change value of change value data 352 being the same as a corresponding change value of change value data 341 indicates that the respective working data block has not been modified. As the first change value ("K") of change value data 352 (corresponding to the first data block of unit of data 344) is different than the first change value ("A") of change value data 341 (corresponding to the first storage data block of unit of data 340), the first working data block of unit of data 344 has been modified from the data that was originally stored as unit of data 340 in the node 338. Data of the first working data block of unit of data 344 should be written to the first storage data block of unit of data 340 in order to update the first storage data block in unit of data 340. The second change value ("B") of change value data 352 (corresponding to the second working data block of unit of data 344) is the same as the second change value ("B") of change value data 341 (corresponding to the second storage data block of unit of data 340) indicating that the second working data block of unit of data 344 has not been modified and should not be updated. Put another way, data corresponding to the second working data block of unit of data 344 does not need to be written to the corresponding second storage data block of unit of data 340. Likewise the third working data block (change value "C"), fourth working data block (change value "D"), fifth working data block (change value "E"), seventh working data block (change value "G"), eighth working data block (change value "H"), ninth working data block (change value "I"), and tenth working data block (change value "J") are the same for unit of data 344 in node 336-3 and unit of data 340 in node 338-1, indicating that these corresponding storage data blocks in unit of data 340 will not be updated.

The sixth working data block of unit of data 344 (change value "L") is different than the sixth storage data block of unit of data 340 (change value "F"), indicating the data has been modified in the node 336 and the corresponding sixth storage data block in data unit 340 in the data storage should be updated. Therefore, the first and sixth storage data blocks of data unit 340 are updated by writing the data from the first and sixth working data blocks of data unit 344 to those corresponding storage data blocks in the node 338-1 (illustrated by node 338-2). In this way, the data of storage data blocks of unit of data 354 in node 338-2 (illustrating an updated node 336) are the same as the working data blocks in the data unit 344 in node 336-3.

In an operation where the node failure either does not occur or a page table is not lost, the page table (e.g., page table 350) can be used to look up which data blocks have been modified and those corresponding data blocks would be written from the working data blocks (e.g., in the node 336) to their respective locations in the node 338. The page table information can be sent to the data storage node 338 for direct memory access (DMA) setup. The modified data blocks indicated by the page table can be sent via DMA to the data storage node 338-2 (without sending the unmodified data blocks) to be written to their corresponding data blocks.

In the event that a node failure causes loss of the page table, a determination of each of the change values for each of the data blocks can be calculated and stored in an internal temporary buffer. Likewise, change values corresponding to each storage data block in the data storage can be sent from the data storage to the internal buffer. The determined change values and the received change values can be compared and each data block where there is a change value difference can be determined. Each data block with a change value difference can be determined to be modified in the working data blocks (e.g., in the SCM) and the data in the working data blocks can be written to the corresponding storage data blocks of the data storage. The data blocks without modifications need not be written out to the data storage, thereby reducing the amount of data transfer. Further, while the modified working data blocks are written out to the data storage, other working data blocks can be modified and/or operations can be performed on other working data blocks in the SCM. In this way, data processing can improve by allowing both data modification and writing data out to update the data storage simultaneously.

Figure 4:
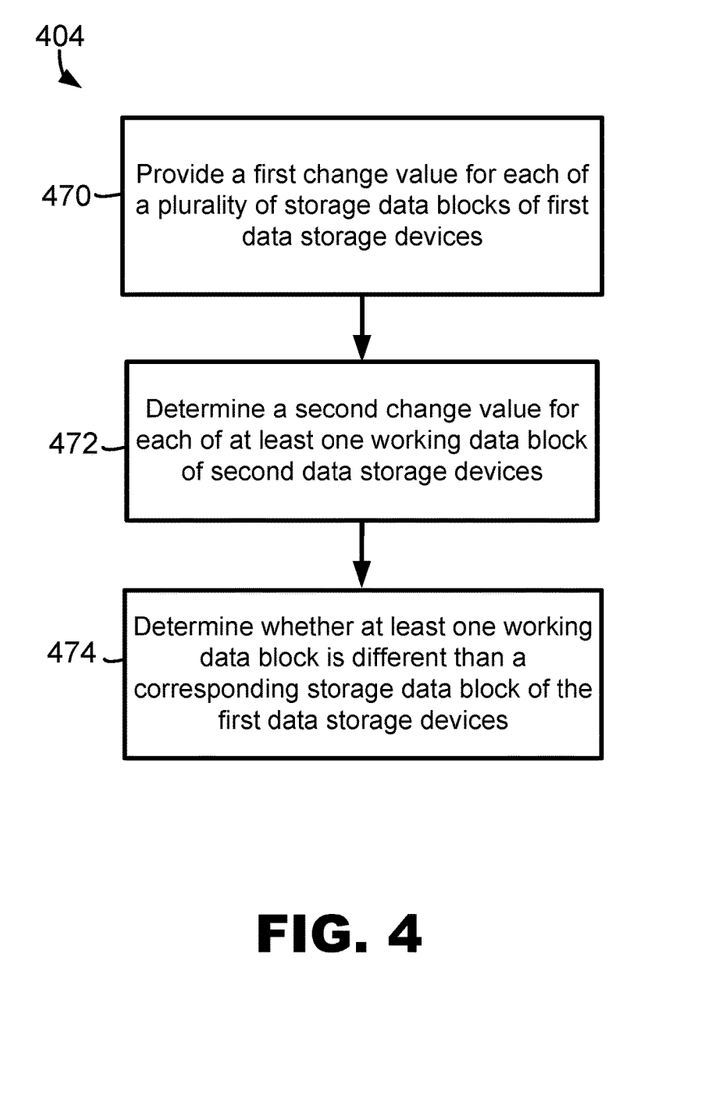
FIG. 4 is a diagram of an example method of monitoring modifications of data in accordance with embodiments of the present disclosure.

FIG. 4 is a diagram of an example method 404 of monitoring modifications of data in accordance with embodiments of the present disclosure. The method 404 can include providing a first change value for each of a plurality of storage data blocks of first data storage devices 470. The method 404 can include determining a second change value for each of the at least one working data blocks of second data storage devices 472. The determining, 472, can be performed in response to a node failure. The method 404 can include determining whether the at least one working data block is different than a corresponding storage data block of the first data storage devices 474. In at least one embodiment, the first change value can be stored on at least one of the first data storage devices.

In at least one embodiment, a node can perform the providing, 470, the determining of the second change value, 472, and the determining whether the at least one working data block is different than the corresponding storage data block of the first data storage devices 474. The node can retrieve the first change value from the at least one first data storage device to perform the determination of whether the at least one working data block is different 474. The first change value is created by a device other than the node. The node can be further configured to determine the at least one working data block is different by determining that the first change value is different than the second change value. The node can be further configured to determine the at least one working data block is not different by determining that the first change value is a same value as the second change value. In response to the node indicating that the at least one working data block is different than the corresponding storage data block of the first data storage devices, the node configured to write data of the at least one working data block to the corresponding storage data block.

Figure 5:
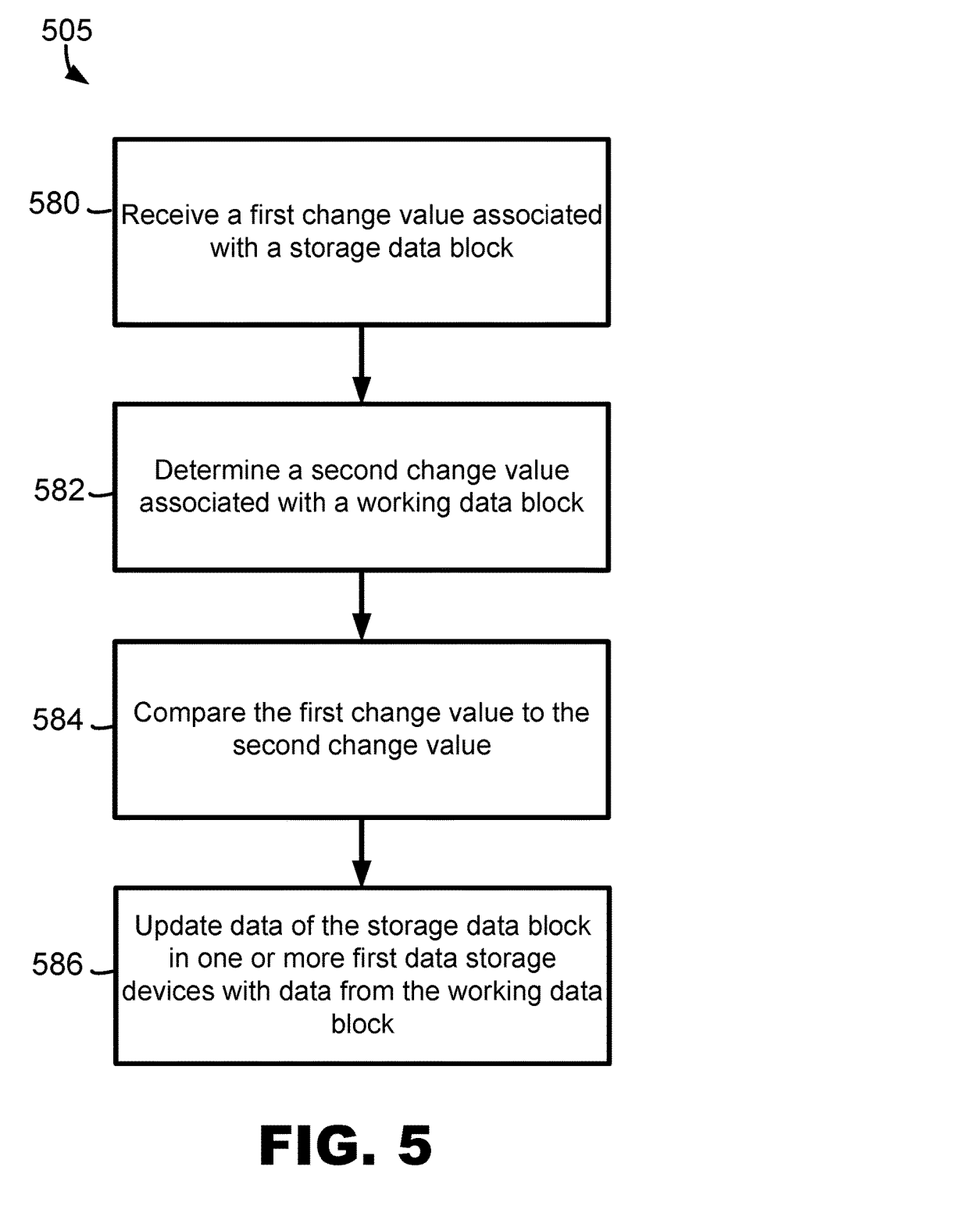
FIG. 5 is a diagram of an example method of monitoring modifications of data in accordance with embodiments of the present disclosure.

FIG. 5 is a diagram of an example method 505 of monitoring modifications of data in accordance with embodiments of the present disclosure. The method 505 can include receiving a first change value associated with a storage data block 580. The storage data block can be stored on one or more first data storage devices storing one or more storage data blocks. The method 505 can include determining a second change value associated with a working data block 582. The working data block can be of one or more second data storage devices storing one or more working data blocks during use thereof. The data stored in the storage data block can correspond to data stored in the working data block. The method 505 can include comparing the first change value to the second change value 584. The method 505 can include updating data of the storage data block in one or more first data storage devices with data from the working data block 586. The updating 586 can be performed in response to the first change value being different than the second change value. In at least one embodiment, the method 505 can include writing updated data to at least one of the one or more data blocks of the one or more second data storage devices concurrently with the updating of the storage data block in the one or more first data storage devices.

Thus, various embodiments of MONITORING MODIFICATIONS OF DATA BLOCKS are disclosed. Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The terms "coupled" or "connected" refer to elements being attached to each other either directly (in direct contact with each other) or indirectly (having one or more elements between and attaching the two elements).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its non-exclusive sense meaning "and/or" unless the content clearly dictates otherwise.

As used herein, "have," "having," "include," "including," "comprise," "comprising" or the like are used in their open ended sense, and generally mean "including, but not limited to". It will be understood that "consisting essentially of," "consisting of," and the like are subsumed in "comprising," and the like.

The phrases "at least one of," "comprises at least one of," and "one or more of" followed by a list refers to any one of the items in the list and any combination of two or more items in the list.

What is claimed is:

1. A controller comprising one or more processors and configured to:
   load data from a storage data block of a plurality of storage data blocks stored on one or more first data storage devices to a working data block stored on one or more second data storage devices, each working data block of the one or more second data storage devices corresponding to one of the plurality of storage data blocks on the one or more first data storage devices;
   in response to a node associated with the controller experiencing a failure causing an irrecoverable loss of information associated with a page table that indicates which working data blocks have been modified, determine a change value for the working data block stored on the one or more second data storage devices; and
   determine whether data stored in the working data block is different than the data stored in the corresponding storage data block of the one or more first data storage devices by comparing a determined change value that corresponds to the storage data block of the one or more first data storage devices to a provided change value in response to the node failure.

2. The controller of claim 1, further configured to, in response to the determined change value being a different value than the provided change value, indicate that data of the storage data block of the one or more first data storage devices associated with the change value has been changed.

3. The controller of claim 1, further configured to, in response to the determined change value being a same value as the provided change value, indicating that the storage data block associated with the provided change value is not to be updated.

4. The controller of claim 1, wherein the one or more second data storage devices comprise one or more storage class memory (SCM) devices.

5. The controller of claim 1, wherein the one or more second data storage devices are on a node.

6. A system comprising:
   one or more first data storage devices to store a plurality of storage data blocks;
   one or more second data storage devices to store at least one working data block during use thereof, each of the at least one working data block corresponding to a different storage data block of the plurality of storage data blocks;
   a node operably coupled to the first data storage devices and the second data storage devices, the node configured to:
      provide a first change value for each of the plurality of storage data blocks of the first data storage devices;
      in response to a node failure causing an irrecoverable loss of information associated with a page table that indicates which working data blocks have been modified, determine a second change value for each of the at least one working data block of the second data storage devices; and
      determine whether the at least one working data block is different than the corresponding storage data block of the first data storage devices by comparing the second change value to the first change value in response to the node failure.

7. The system of claim 6, wherein the first change value is stored on at least one of the first data storage devices; and wherein the node retrieves the first change value from the at least one first data storage device to perform the determination of whether the at least one working data block is different.

8. The system of claim 6, wherein the first change value is created by a device other than the node.

9. The system of claim 6, wherein the node is further configured to determine the at least one working data block is different by determining that the first change value is different than the second change value.

10. The system of claim 6, wherein the node is further configured to determine the at least one working data block is not different by determining that the first change value is a same value as the second change value.

11. The system of claim 6, wherein, in response to the node indicating that the at least one working data block is different than the corresponding storage data block of the first data storage devices, the node configured to write data of the at least one working data block to the corresponding storage data block.

12. The system of claim 11, wherein the node configured to write the data of the at least one working data block comprises the node configured to transfer the data of the at least one working data block to a server memory buffer via direct memory access (DMA).

13. The system of claim 6, wherein the first change value of each of the plurality of storage data blocks is a checksum of each of the plurality of storage data blocks of the first data storage devices; and wherein the second change value of each of the at least one working data block is a checksum of each of the at least one working data block of the second data storage devices.

14. The system of claim 6, wherein the node comprises the at least one working data block.

15. The system of claim 6, wherein the second data storage devices are of a different type than the first data storage devices.

16. The system of claim 6, wherein the second data storage devices transfer data at a faster rate than the first data storage devices.

17. The system of claim 6, wherein both of the first and second data storage devices are persistent data storage devices.

18. A method comprising:
receiving a first change value associated with a storage data block stored on one or more first data storage devices storing one or more storage data blocks;
determining a second change value associated with a working data block of one or more second data storage devices storing one or more working data blocks during use thereof, and data stored in the storage data block corresponding to data stored in the working data block;
comparing the first change value to the second change value in response to a failure causing an irrecoverable loss of information associated with a page table that indicates which working data blocks have been modified; and
in response to the first change value being different than the second change value, updating the data of the storage data block in the one or more first data storage devices with the data from the working data block.

19. The method of claim 18, comprising writing updated data to at least one of the one or more data blocks of the one or more second data storage devices concurrently with the updating of the storage data block in the one or more first data storage devices.

* * * * *